United States Patent
Wang

(10) Patent No.: US 10,661,476 B2
(45) Date of Patent: May 26, 2020

(54) POROUS NANOSTRUCTURES AND METHODS OF FABRICATION

(71) Applicant: Xuan Wang, San Luis Obispo, CA (US)

(72) Inventor: Xuan Wang, San Luis Obispo, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 468 days.

(21) Appl. No.: 15/159,328

(22) Filed: May 19, 2016

(65) Prior Publication Data

US 2017/0334792 A1    Nov. 23, 2017

(51) Int. Cl.
 | | |
|---|---|
| C04B 38/00 | (2006.01) |
| B28B 17/02 | (2006.01) |
| C04B 38/06 | (2006.01) |
| C04B 111/00 | (2006.01) |

(52) U.S. Cl.
CPC ........ *B28B 17/026* (2013.01); *C04B 38/0615* (2013.01); *C04B 2111/00801* (2013.01)

(58) Field of Classification Search
CPC ............ B28B 17/026; C04B 2235/605; C04B 2235/6026; C04B 35/634; C04B 35/622; C04B 35/111; C04B 35/486
See application file for complete search history.

(56) References Cited

U.S. PATENT DOCUMENTS

| | | | |
|---|---|---|---|
| 6,236,493 B1 * | 5/2001 | Schmidt | .................. G02B 1/04 |
| | | | 359/290 |
| 8,393,478 B2 | 3/2013 | Fekety | |
| 9,039,918 B2 | 5/2015 | Balagopal | |
| 9,136,568 B2 | 9/2015 | Visco | |
| 9,205,383 B2 | 12/2015 | Perry | |
| 2009/0288952 A1 * | 11/2009 | Olevsky | .................. B28B 1/262 |
| | | | 204/483 |

OTHER PUBLICATIONS

Fabrication and Characterization of Porous Membranes with Highly Ordered Three-Dimensional Periodic Structures, Chem. Mater., 1999, 11 (10), pp. 2827-2836.
(Continued)

*Primary Examiner* — Xiao S Zhao
*Assistant Examiner* — Ninh V Le
(74) *Attorney, Agent, or Firm* — Todd R. Miller

(57) ABSTRACT

Novel methods of fabricating porous structures (e.g., nanostructures) and resulting structures are disclosed. The novel methods use precision optics to cure a slurry made from one or more powders mixed with photopolymers. Pore size control preferably is achieved by controlling the powder size and powder loading in the slurry. As the disclosed methods are based on optics to control the thickness preferably without any mechanical movements, extreme tight thickness tolerance, as well as control of the profile structure, may be achieved. The novel disclosed methods are highly-cost effective with shorter manufacturing cycle time compared to conventional methods. Moreover, a supporting substrate may not be required as the resultant structure made by the novel fabrication techniques disclosed herein has enough strength to be free-standing.

8 Claims, 4 Drawing Sheets

(56) References Cited

OTHER PUBLICATIONS

Fabrication of all-polymer micro-DMFCs using UV-sensitive photoresist, Electrochimica Acta vol. 50, Issues 2-3, Nov. 30, 2004, pp. 795-799.
Griffith, M.L. Halloran, J.W. "Freeform Fabrication of Ceramics via Stereolithography." Journal of the American Ceramic Society, 79.10 (1996): 2601-2608.
Balachandran, U, TH Lee, CY Park, JE Emerson, JJ Picciolo, and SE Dorris. "Dense Cermet Membranes for Hydrogen Separation." Separation and Purification Technology, 121 (2014): 54-59.
Uchikoshi, T, L Kreethawate, C Matsunaga, S Larpkiattaworn, S Jiemsirilers, and L Besra. "Fabrication of Ceramic Membranes on Porous Ceramic Supports by Electrophoretic Deposition." Advances in Applied Ceramics, 113.1 (2014): 3-7.
Inorganic Membranes Synthesis, Characteristics and Applications. New York: Van Nostrand Reinhold, 1991, pp. 10-63.
Choudhury, S., Mangal, R., Agrawal, A., & Archer, L. (2015). A highly reversible room-temperature lithium metal battery based on crosslinked hairy nanoparticles. Nature Communications, 6, 10101-10109.
Fujiwara, M., & Imura, T. (2015). Photo induced membrane separation for water purification and desalination using azobenzene modified anodized alumina membranes. ACS Nano, 9(6), 5705-5712.
Vazquez, M., Romero, V., Vega, V., Garcia, J., Prida, V., et al. (2015). Morphological, chemical surface, and diffusive transport characterizations of a nanoporous alumina membrane. Nanomaterials, 5(4), 2192-2202.
Sainiemi, L., Grigoras, K., & Franssila, S. (2009). Suspended nanostructured alumina membranes. Nanotechnology, 20(7), 075306-075311.
Olevesky et al., "Synthesis of gold micro- and nano-wires by infiltration and thermolysis," Scripta Materialia 56 (2007) 867-869.
lithoz.com, May 18, 2016 Internet printout, http://www.lithoz.com/en/.

* cited by examiner

POROUS NANOSTRUCTURES AND METHODS OF FABRICATION

BACKGROUND

The present disclosure generally relates to porous structures such as nanostructures and particularly wholly or partially inorganic porous structures. These types of structures are in ever-increasing global demand for applications including but not limited to gas separation, liquid separation, printed electronics substrates, solid oxide fuel cells, and lithium batteries.

A porous structure may be a selective barrier comprised of inorganic and/or organic materials with varying dimensions and pore sizes. Such structures may have enhanced thermal, mechanical, chemical, and/or electrical properties compared to other structures.

Examples of porous structures include nanostructures, which may be man-made objects having one, two, or three-dimensions in the sub-micrometer to nanometer range. A nanostructure may be porous or non-porous, as well as comprised of organic and/or inorganic materials.

Functions for these types of structures include separation, immobilization, contacting, and/or controlled release. With such an array of functions, it is therefore apparent why these type of structures have a large number of industrial applications including but not limited to water treatment, chemical purification, recovery and concentrating of substrates, dialysis, electrophoretic painting, semiconductor manufacture, controlled release in agriculture, fuel cells, and the like.

The global demand for some of the subject structures was estimated to be approximately USD$ 18.4 billion in 2014. Driven by new developments and innovations in materials science and process technologies, the market is expected to grow around 8% annually to reach USD$ 26.10 billion by 2020.

In an attempt to meet such demand, the instant application discloses a novel fabrication method of generating a porous structure and products made by these and related methods.

SUMMARY

One exemplary embodiment of the disclosed subject matter is a method of fabrication including forming a slurry comprised of a powder and photopolymer, projecting a light onto the slurry surface to form a structure, and post-processing the structure. The method may further comprise controlling the powder size and powder loading in the slurry for pore size uniformity control and/or controlling environmental conditions including but not limited to temperature and/or electric, magnetic, or electromagnetic conditions. The light is preferably an ultraviolet light projected from a digital light processing module.

The method may further comprise providing a reservoir to hold the slurry once formed. Alternatively, the method may comprise the step of placing the slurry onto a supporting substrate before projecting the light.

The powder may be comprised of an inorganic material. Such an inorganic material may be ferromagnetic in which case the method may further comprise the step of maintaining the inorganic material in place using a magnet.

Aspects of the subject technology also include products made by these and related methods.

BRIEF DESCRIPTION OF THE DRAWINGS

Some non-limiting exemplary embodiments of the disclosed subject matter are illustrated in the following drawings. Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described. Dimensions of components and features shown in the figures are chosen for convenience or clarity of presentation. For convenience or clarity, some elements or structures are not shown or shown only partially and/or with different perspective or from different point of views.

DESCRIPTION

Figure 1:
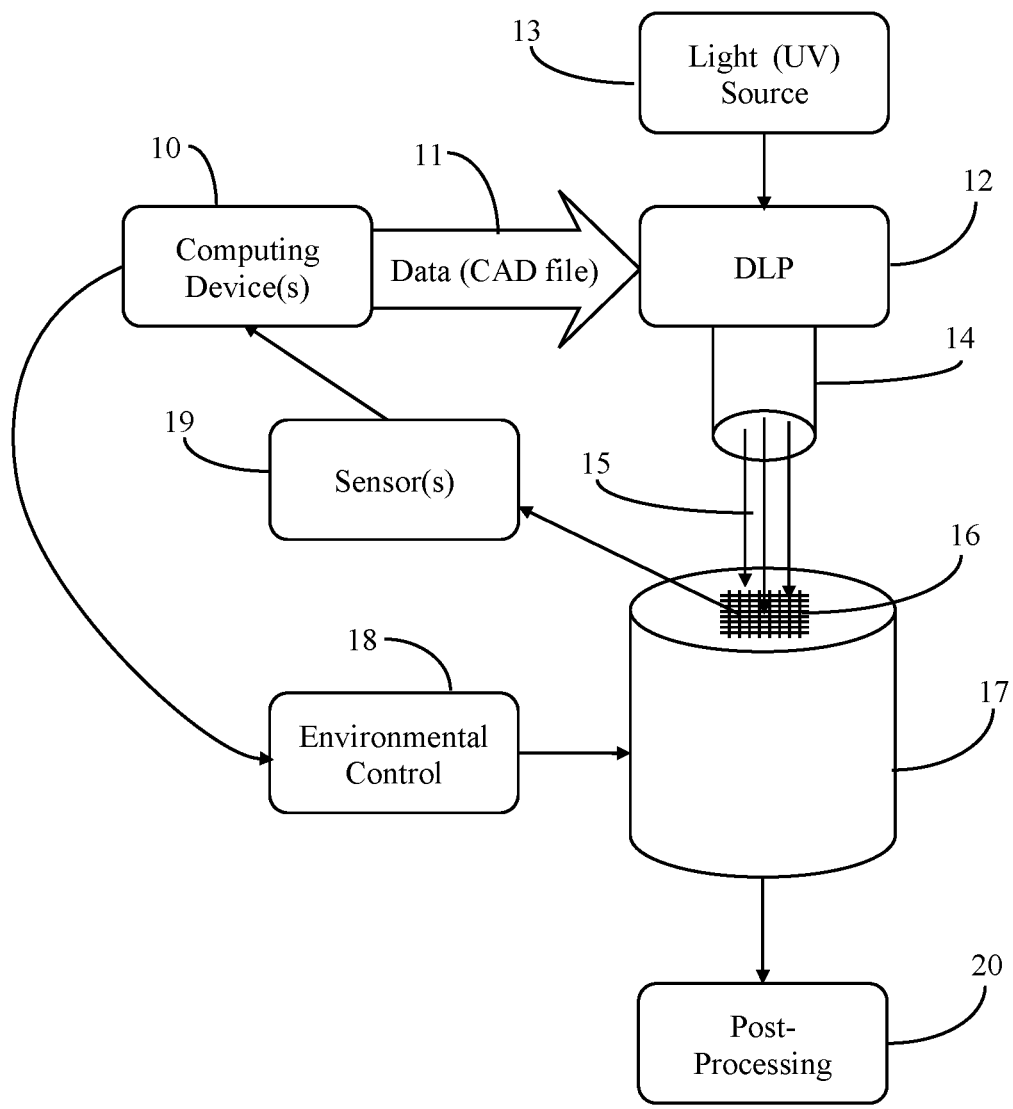
FIG. 1 shows a schematic overview of an exemplary set-up for fabrication of a porous nanostructure according to aspects of the subject technology.

Porous structures such as a membrane or film made of ceramics and ceramic/polymer composites are desirable structures in water filtration, solid oxide fuel cells, and lithium metal batteries due to the pores that are permeable only to specific species. In these structures, pore size, thickness, mechanical, optical, and thermal properties are key drivers to improve the device performance. For instance, a cross-linked hairy nanoparticle structure has demonstrated a magnitude of performance increase in lithium metal batteries.

New developments in these types of structures include a focus on inorganics. Precursor porous structures developed using prior techniques have been used in commercial applications since at least the 1970's despite their inadequacies. These type of structures have become increasingly more important in applications including gas separation, liquid separation, printed electronics substrate, solid oxide fuel cells, and lithium batteries due to their temperature and chemical stability compared to polymeric structures.

By way of example, Pd/YSZ (Yttrium Stabilized Zirconia) has great potential in the gas separation industry. Traditionally this type of structure has been produced by cold pressing in a die followed by sintering. Ceramic structures, such as $Al_2O_3$ and silica, have found applications in liquid separation. Dense structure made from $ZrO_2$, has been available commercially for packaging substrate in wearable computing devices.

Traditional fabrication methods of porous structures include sol-gel, tape casting, screen printing, polymerization, chemical vapor deposition, and physical vapor deposition. Each of these manufacturing methods has the following drawbacks as summarized in the table below:

| Method | Pore size uniformity | Structure thickness uniformity | Manufacturing cycle time | Cost | Supporting substrate |
| --- | --- | --- | --- | --- | --- |
| Sol-gel | Poor | Good | Long | Medium | Not required |
| Tape casting | Poor | Poor | Medium | Low | Not required |
| Screen printing | Poor | Poor | Medium | Low | Not required |
| Polymerization | Good | Poor | Short | Medium | Not required |
| Chemical Vapor Deposition | Excellent | Excellent | Medium | High | Required |
| Physical Vapor Deposition | Excellent | Excellent | Medium | High | Required |

As seen in the above table, a general problem in the field of porous structures including structures is cost and time of fabrication. A general solution disclosed here is the use of a slurry containing photopolymers and optics to reduce costs and time significantly compared to traditional methods.

Another general problem in the field of porous structures is temperature and chemical instability of the structure when in use in certain applications. A general solution disclosed here is the use of inorganic materials to fabricate a structure to enhance temperature and chemical stability as well as other properties compared to organic structures.

A technical problem in the field of porous structures is the lack of pore size uniformity. A technical solution implementing the spirit of the disclosed subject technology is the use of a slurry wherein pore size control is achieved by controlling the powder size and powder loading in the slurry.

Another technical problem in the field of porous structures is the fabrication of a composite structure. A technical solution implementing the spirit of the disclosed subject technology is the use of different materials to fabricate composite structures and do so conveniently.

A further technical problem in the field of porous structures is the lack of control of structure thickness. A technical solution implementing the spirit of the disclosed subject technology is the use of optics to control the thickness without any mechanical movement.

Yet another technical problem in the field of porous structures is the lack of control of the profile of a structure. A technical solution implementing the spirit of the disclosed subject technology is the use of a light processing module and a photopolymer slurry to obtain structures with any profile including those difficult to obtain by mechanical means such as by punching or stamping and/or without the need for tooling.

An additional technical problem in the field of porous structures is the reliance on a supporting substrate for some structure fabrication methods. A technical solution implementing the spirit of the disclosed subject technology is the use of a photopolymer-based slurry and optics to fabricate a structure with enough strength to be free-standing.

Accordingly, a novel fabrication method of generating a porous structure, including a porous nanostructure and particularly an inorganic structure, is therefore desired. Such a fabrication method should have the following advantages and benefits compared to traditional fabrication methods: excellent pore size uniformity; excellent structure thickness uniformity; short manufacturing cycle time; low cost; and no required supporting substrate.

Potential benefits of the general and technical solutions provided by the disclosed subject matter include but are not limited to the novel fabrication of a porous nanostructure as a porous ceramic structure for water filtration, ceramic structure in a wearable computing device, separation structure in a solid oxide fuel cells, separation structure in lithium metal batteries, and similar applications.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

FIG. 1 shows a schematic overview of an exemplary set-up for fabrication of a porous nanostructure. Such a set-up or system may include the following major components: an ultraviolet ("UV") or other light source such a light emitting diode or laser, a digital light projection ("DLP") module, and a reservoir to contain the mixed slurry. The slurry is preferably made of inorganic powders such as ceramic or metallic powders with photopolymers that cures at a given light wavelength such as 405 nm. A digital file representing the profile of the structure is sent to the DLP module, which projects a UV light on the slurry. The slurry is cured quickly, such as in about 10 seconds, to form a structure.

The cure depth is controlled by the powder size, exposure energy, and particle volume loading from Beer-Lambert law:

$$C_d \propto \frac{d}{\emptyset} \frac{1}{Q} \ln\left[\frac{E_0}{E_C}\right]$$

where d is particle size, Ø is the particle volume fraction, Q and Ec are material constant, and $E_\emptyset$ is the exposure energy. The resultant structure may be free-standing, or on a substrate, depending on the cure depth of the UV light.

After the exposure, the structure is transferred to a post-processing process such as a sintering process in which it will be further densified to achieve a desired porosity and mechanical strength. During sintering, for example, photopolymers will be burnt out leaving only a porous ceramic or metallic structure.

Control of certain environmental conditions such as temperature, electric, magnetic, and/or electromagnetic conditions also may be applied. For example, very low temperature conditions may be created to reduce movement of molecular structures during the creation of a structure. For another example, a magnetic, electric, and/or electromagnetic field may be applied to affect certain materials used in processes according to aspects of the subject technology.

A feedback loop involving one or more sensors may be used to enhance further the potential benefits of the subject technology. For example, a feedback loop may be used to compensate for possible non-uniformity in a slurry that is being processed.

In more detail, FIG. 1 shows computing device(s) 10 that may control aspects of processes according to the subject technology. The computing device(s) may be a local computing device, a remote computing device, one or more networked computing devices (e.g., the "Cloud"), any other computing device, or some combination thereof.

The computing device(s) preferably generate, access, or otherwise use data 11 such as a Computer Aided Design ("CAD") file that describes how light is to be transmitted by the DLP module 12 to assist in creation of porous structures according to aspects of the subject technology. The light preferably comes from light source 13, for example a UV light source. This light may be transmitted through optical system 14.

Optical system 14 may include lenses, prisms, mirrors, and/or other optics to focus light from light source 13. The optical system may have one or more elements controlled by computing device(s) 10. The resulting light 15 may be applied to a single layer of a material being processed such as layer 16 of a slurry suspension 17. The slurry preferably includes photopolymers and inorganic materials. Alternatively, the slurry may include organic materials instead of or in addition to inorganic materials.

In some aspects, the slurry suspension 17 may or may not be supported by a substrate. Creation of a porous structure such as a nanostructured membrane from such a slurry in the absence of a substrate is believed to be novel unto itself.

Environmental control 18 may be used to enhance the uniformity or otherwise affect the creation of a porous structure according to aspects of the subject technology. For example, environmental control 18 may influence a temperature, electric field, magnetic field, and/or electromagnetic field before, during, and/or after creation of a porous structure.

For one non-limiting example, liquid nitrogen may be used to increase the stability of the resultant structure by freezing a slurry into place before application of light. Doing so may aid in the alignment of the inorganic materials before post-processing. Similarly, inorganic materials may be ferromagnetic and a magnetic field may be applied to the slurry during processes according to aspects of the subject technology to maintain a desired alignment of materials before further processing.

Sensor(s) 19 may be included to provide information to computing device(s) 10 to effectuate an active feedback loop. The feedback loop may be used to compensate for detected potential problems with uniformity or other defects during the creation of a porous structure. Examples of sensor(s) 19 include but are not limited to optical sensors, X-ray sensors, acoustic sensors, and/or any other type of sensor(s).

Post-processing may then be performed by block 20, for example but not limited to sintering, annealing, application of chemicals, physical manipulation, or the like.

Figure 2:
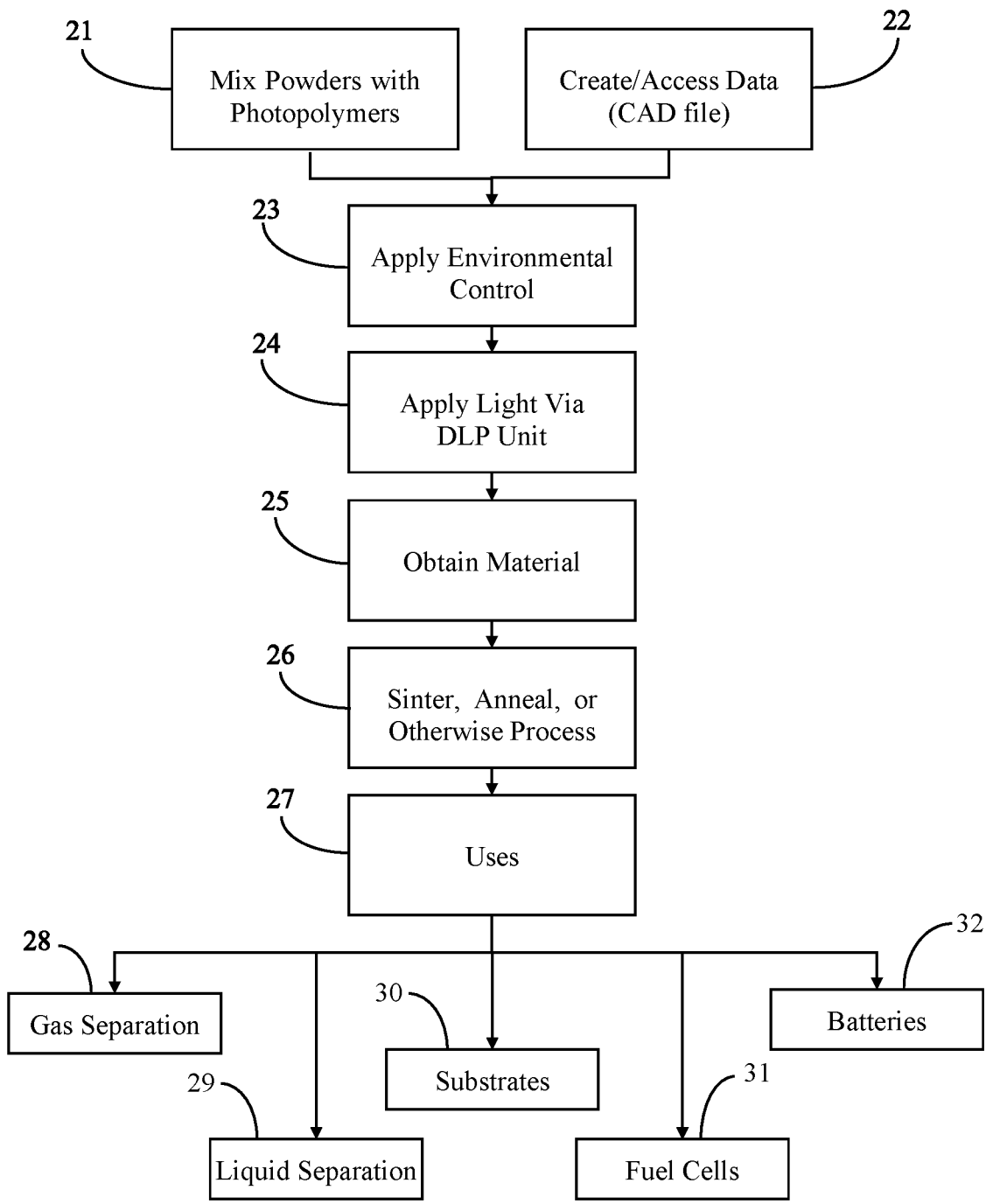
FIG. 2 shows an exemplary overview flowchart of a method of creating an inorganic structure according to aspects of the subject technology disclosed herein.

FIG. 2 shows an exemplary overview flowchart of a method of creating an inorganic structure according to aspects of the subject technology disclosed herein. In particular, inorganic powders are mixed with one or more photopolymers in step 21. Alternatively, organic powders or other materials may be mixed with the photopolymers.

Data such as a CAD file is created and/or accessed in step 22. The file may be created and/or then provided by one or more computing devices, for example as described above with respect to FIG. 1.

In optional step 23, environmental controls may be applied, for example to align macro-pores, micro-pores, and/or nano-pores before, during, and/or after application of light in step 24. These controls may affect temperature, electric, magnetic, electromagnetic, and/or other environmental factors. For example, liquid nitrogen may be applied to generate a temperature gradient that may facilitate generation of aligned macro-pores. For another example, an electric or magnetic field may be applied to facilitate generation of a desires alignment or structure.

Generated light preferably processed by a DLP unit may be applied to the powder mixed with a photopolymer in step 24. A porous material such as a membrane is obtained in step 25. This material may then be further processed in step 26, for example by sintering, annealing, application of chemicals, physical manipulation, or the like.

Step 27 labeled "Uses" and the subsequently illustrated steps represent myriad industrial applications of a structure generated according to aspects of the subject technology. Examples include but are not limited to gas separation 28, liquid separation 29, substrates 30 such as printed electronic substrates, fuel cells 31 such as solid or liquid oxide fuel cells, and batteries 32 such as lithium batteries. Uses 27 may include other industrial applications as well.

Some examples aspects of real-world demonstrative use of the subject technology are discussed below. The subject technology is not limited to these examples.

Figure 3:
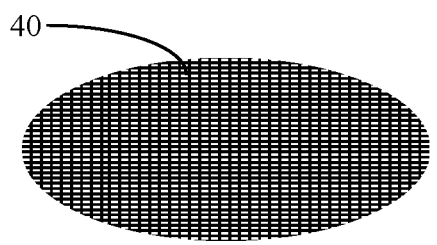
FIG. 3 shows an example of a porous nanostructure made by aspects of the subject technology disclosed herein.

FIG. 3 shows a representation of an example porous nanostructure 40 made by an embodiment of the subject technology. The figure is intended to represent enhanced uniformity of the structure over those made with prior techniques. The figure particularly represents an example of a zirconium dioxide ($ZrO_2$) structure fabricated by the novel methods disclosed herein. Such a structure has been found to be useful as a packaging substrate in wearable computing devices. Again, the subject technology is not limited to this result.

Aspects of the subject technology have also been applied to aluminum oxide ($Al_2O_3$). The alumina powder, CERALOX® SPA-0.5 was obtained from Sasol North America, Inc. The particle size (D-50) was 0.4 µm. The procedure of mixing and DLP exposure was the same as for the zirconium dioxide example above. A membrane with superior uniformity over those produced with other methods was achieved. Such a structure may be particularly useful in liquid separation applications. Again, the subject technology is not limited to this result.

Figure 4:
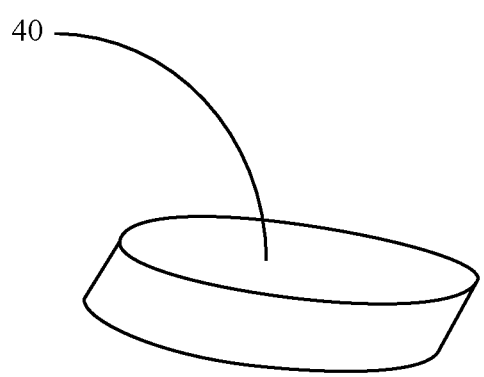
FIG. 4 show a representation of a CAD file that was used to fabricate a zirconium dioxide membrane.

FIG. 4 shows representation 40 of a CAD file that was used to fabricate the zirconium dioxide membrane discussed above. The actual CAD file was created using SOLIDWORKS®. Any other CAD and/or appropriate data generation program, application, method, and/or some combination thereof may also be used.

While certain embodiments of the subject technology have been described, the embodiments have been presented by way of example only. For instance, generally circular, elliptical, and/or cylindrical structures and/or data models are shown and described with respect to some of the figures. However, other shapes of various sizes may be generated and/or used according to aspects of the subject technology. Embodiments of the subject technology also have been described with respect to certain materials. However, other materials may be used.

Likewise, the invention is in no way limited to the specifics of any particular embodiments and examples disclosed herein. Terms "such as," "aspect," "example," "e.g.", "preferably," "alternatively," "may," and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope, and spirit of the invention, and these variations would become clear to those skilled in the art after perusal of this application.

Indeed, the novel structures and methods of fabrication disclosed herein may be embodied in a variety of other forms; furthermore, various omissions, substitutions, and changes in the form of the devices and methods described herein may be made without departing from the spirit of the subject technology. The accompanying claims and their equivalents are intended to cover such forms or modifications as would fall within the scope and spirit of the subject technology.

The invention claimed is:

1. A method comprising: forming or using a slurry comprised of a powder and photopolymer; providing the slurry in a reservoir, wherein the reservoir has a first shape; projecting light based on digital data representing a profile of a structure onto a surface of the slurry to form the structure, wherein the structure has a second; and post-processing the structure; wherein the powder comprises an inorganic material; wherein the inorganic material is ferromagnetic; and further comprising the step of maintaining the inorganic material in place using a magnet during the projecting light step.

2. The method of claim 1, further comprising controlling the powder size and powder loading in the slurry for pore size uniformity control.

3. The method of claim 1, wherein the light comprises an ultraviolet light projected from a digital light processing module.

4. The method of claim 1, further comprising controlling environmental conditions before or during projecting the light onto the slurry surface to form the structure.

5. The method of claim 4, wherein the environmental conditions include temperature.

6. The method of claim 4, wherein the environmental conditions include electric, magnetic, or electromagnetic conditions.

7. The method of claim 1, wherein the post-processing comprises removing the photopolymer from the structure.

8. The method of claim 1, further comprising using information from sensors in an active feedback loop to compensate for non-uniformity or defects in the slurry.

* * * * *